United States Patent [19]
Doi

[11] 3,861,933
[45] Jan. 21, 1975

[54] ASPHALT HAVING HIGH ADHESION STRENGTH AND ITS PREPARATION

[75] Inventor: Tadashi Doi, Osaka, Japan
[73] Assignee: Kao Soap Co., Ltd., Tokyo, Japan
[22] Filed: Mar. 5, 1973
[21] Appl. No.: 338,412

[30] Foreign Application Priority Data
Mar. 9, 1972    Japan.............................. 47-24145

[52] U.S. Cl..... 106/273 N, 106/281 N, 106/287 SB
[51] Int. Cl...................... C08h 13/00, C08h 17/44
[58] Field of Search...... 106/273 N, 273 R, 287 SB, 106/277–284; 260/448.2, 448.8

[56]    References Cited
    UNITED STATES PATENTS
2,570,185    10/1951    Aldrich........................... 106/273 N
    FOREIGN PATENTS OR APPLICATIONS
800,685    11/1950    Germany........................... 106/277

Primary Examiner—Joseph L. Schofer
Assistant Examiner—H. Lilling
Attorney, Agent, or Firm—Woodhams, Blanchard and Flynn

[57]    ABSTRACT

Asphalt having a high adhesion strength is prepared by incorporating in asphalt a small amount of an aminoalkyl polyalkoxysilane expressed by the following general formula:

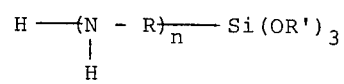

wherein R is an alkylene group having 2 to 3 carbon atoms, R' stands for an alkyl group having one to two carbon atoms and $n$ is an integer of 1 to 2, as antistripping agent.

3 Claims, 1 Drawing Figure

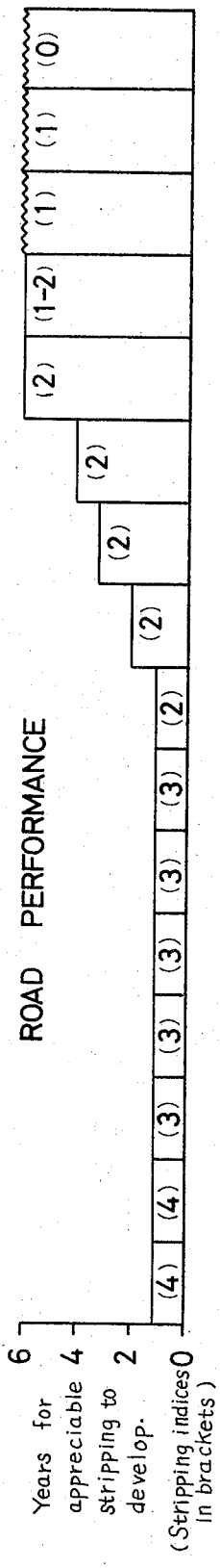
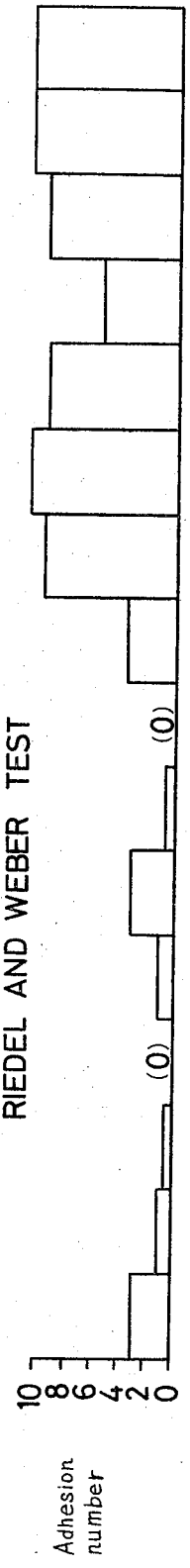

ASPHALT HAVING HIGH ADHESION STRENGTH AND ITS PREPARATION

BACKGROUND OF THE INVENTION

1. Field of the Invention

This invention relates to asphalt having a high adhesion strength and its preparation. Particularly, it relates to a novel asphalt additive for imparting to asphalt a high adhesion strength when the additive is incorporated in asphalt in a small amount.

2. Description of the Prior Art

It is known that, in case asphalt is used for pavement, it is necessary to attain a sufficient adhesion between an aggregate such as crushed stone or sand and asphalt.

However, since the surface of such aggregate to which asphalt is applied is generally hydrophilic, if it is wet with water, it is difficult to stick asphalt to such aggregate. Further, even if asphalt is once coated to the aggregate, it is stripped off by an action of rain water, underground water and water contained in the aggregate per se. This is the defect of asphalt as regards its general properties.

In asphalt-paved roads, as the degree of the stripping of asphalt is advanced, necessity of repair works such as overlaying is increased, resulting apparently in economical disadvantages. Thus. occurrence of stripping of asphalt gives great influences to the durability of paved roads.

Diamines and imidazoline compounds have heretofore been mainly used as antistripping agents or adhesion agents for improving an adhesion property of asphalt.

However, these compounds fail to impart a practically sufficient adhesion strength. More specifically, the period during which the effect of these compounds is sustainable is generally about 3 years they are used in amounts of 0.3% by weight based on asphalt.

BRIEF DESCRIPTION OF DRAWING

FIG. 1 is a diagram illustrating the relation between the adhesion number of asphalt by RIEDEL & WEBER TEST and the stripping property of asphalt observed at the road performance.

SUMMARY OF THE INVENTION

I have made extensive research works with a view to discovering an asphalt additive excellent over the conventional additives and capable of imparting a high adhesion property to asphalt and have found that aminoalkyl polyalkoxysilanes expressed by the following general formula meet fully the above object;

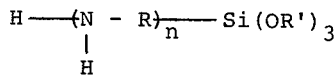

wherein R is an alkylene group having two to three carbon atoms, R' stands for an alkyl group having one to two carbon atoms, and $n$ is an interger of 1 to 2.

As examples of the compounds expressed by the above general formula, there may be mentioned β-aminoethyl-γ-aminopropyl trimenthoxysilane, β-aminoethyl-γ-aminopropyl triethoxysilane, γ-aminopropyl-γ-aminopropyl triethoxysilane, γ-aminopropyl γ-aminopropyl trimethoxysilane, γ-aminopropyl trimethoxysilane, γ-aminopropyl triethoxysilane, etc.

British Road Research Institute published indoor tests corresponding with actual road tests (road performance), and there is Riedel & Weber Test among these indoor tests. This Riedel & Weber test is very simple and results of this indoor test agree relatively well with results of the road performance.

The effects of this invention were, therefore, confirmed according to this Riedel & Weber Test.

The Riedel & Weber test is conducted in the following manner. 43 Parts by weight of an aggregate having a particle size of 0.15 to 0.074 mm is mixed with 43 parts by weight of an aggregate having a particle size of 0.3 to 0.15 mm, and the mixture is heated at 170°C. Then, 14 parts by weight of asphalt heated and molten at 150°C is added to the heated aggregate mixture, and then the blend is mixed well to coat the aggregate completely with the asphalt. Then, 0.5 g of the resulting coated aggregate is added to a beaker charged with 25 ml of a sodium carbonate solution having a prescribed concentration shown below, and the solution is boiled for 1 minute. A solution of a lowest concentration in which even a small amount of the asphalt is stripped completely from the aggregate for the first time is recorded to determine the adhesion number. The relation between the sodium carbonate concentration at which separation of clean aggregate particles first occurs and the adhesion number is as follows:

| Sodium carbonate concentration (molar concentration) | Adhesion number |
|---|---|
| 0 | 0 |
| 1/256 | 1 |
| 1/128 | 2 |
| 1/64 | 3 |
| 1/32 | 4 |
| 1/16 | 5 |
| 1/8 | 6 |
| 1/4 | 7 |
| 1/2 | 8 |
| 1 | 9 |

In case no stripping occurs in the sample at a sodium carbonate concentration of 1 M, the adhesion number of the sample is 10.

The relation between this adhesion number and the degree of stripping observed at the actual road test, which is shown by the stripping index, is as shown in FIG. 1. From FIG. 1, it will readily be understood that the adhesion number determined by the above method is directly proportional to the stripping property of asphalt shown by the stripping index.

In the drawing, symbols A, B, C and D indicate kinds of aggregates used in adhesion tests, details of which are as follows:

| | |
|---|---|
| Basalt A | spilitic basalt |
| Basalt B | albitized olivine-dolerite |
| Basalt C | olivine-dolerite with analcite |
| Basalt D | quarz-dolerite |
| Granite A | soda granite |
| Granite B | granophyric diorite |
| Gritstone A | porphyritic breccia |
| Gritstone B | greywacke |
| Hornfels A | diabase hornfels |
| Porphyry A | biotite porphyrite |
| Porphyry B | pyroxene-granophyre |
| Porphyry C | quarz-diorite-porphyrite |
| Flint gravel A | flint gravel |
| Limestone A | limestone |
| Slag A | blast furnace slag |

Further, the stripping indices in brackets in FIG. 1 show the following degrees of stripping, respectively:

0 : no stripping

1 : slightly stripped
2 : considerably stripped
3 : very violently stripped
4 : completely stripped In the actual road pavement, river sand is used. Since the size of river sand is small, the surface area of river sand occupies the greatest proportion of the total surface area of the aggregate.

Accordingly, when the adhesion numbers of the gritstone in FIG. 1 are examined, it is seen that in case the adhesion number is 6 or more, stripping does not occur within 6 years.

It is considered that an excellent antistipping effect of the above aminoakyl polyalkoxysilane in this invention is due to the synergetic effect attained by the polysiloxane ($SiO_n$) formed by hydrolysis and the amino group contained in the molecule.

It is generally preferred that the aminoalkyl polyalkoxysilane of the present invention is added in an amount of 0.3 to 2 percent by weight based on the amount of asphalt.

This invention will now be illustrated by reference to Example.

EXAMPLE

The above-mentioned Riedel & Weber test was conducted by employing river sand produced at Kinokawa and asphalt having a penetration of 60 to 80. Results are shown in Table 1.

Table 1

| | Antistripping agent | Amount added (% by weight) | Adhesion number |
|---|---|---|---|
| Examples of this invention | β-aminoethyl-γ-aminopropyl trimethoxysilane | 0.5 | 10 |
| | | 0.3 | 6 — 7 |
| | β-aminoethyl-γ-aminopropyl triethoxysilane | 0.5 | 10 |
| | | 0.3 | 6 — 7 |
| | γ-aminopropyl-γ-aminopropyl trimethoxysilane | 0.5 | 10 |
| | | 0.3 | 6 — 7 |
| | γ-aminopropyl triethoxysilane | 1.0 | 10 |
| | | 0.5 | 6 — 7 |
| | γ-aminopropyl trimethoxysilane | 1.0 | 10 |
| | | 0.5 | 6 — 7 |
| | not added | 0 | 1 |
| | beef-tallow-alkyl propylene diamine | 2.0 | 2 — 3 |
| | adduct of 1 mole of beef-tallow-alkyl propylene diamine and 3 moles of ethylene oxide | 2.0 | 2 — 3 |
| | oleate of adduct of 1 mole of | | |

Table 1 —Continued

| | Antistripping agent | Amount added (% by weight) | Adhesion number |
|---|---|---|---|
| Comparative examples | beef-tallow-alkyl propylene diamine and 3 moles of ethylene oxide | 2.0 | 2 — 3 |
| | oleic acid | 2.0 | 0 |
| | 1-aminoethyl-2-heptadecenyl-imidazoline-2 | 2.0 | 2 — 3 |
| | vinyl triethoxysilane | 1.0 | 1 |
| | methyl triethoxysilane | 1.0 | 1 |

From the above test results, it will readily be understood that the aminoalkyl polyalkoxysilanes of this invention exhibit a very excellent antistripping effect.

The embodiment of the invention in which an exclusive property or privilege is claimed are defined as follows:

1. An asphalt composition having a high adhesion strength, comprising road-paving asphalt having mixed therein from 0.3 to 2% by weight, based on the amount of asphalt, of an aminoalkyl polyalkoxysilane having the formula:

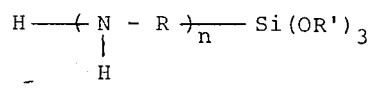

wherein R is alkylene having two or three carbon atoms, R' is alkyl having one or two carbon atoms and n is an integer of 1 to 2.

2. An asphalt composition according to claim 1, in which said aminoalkyl polyalkoxysilane is selected from the group consisting of β-aminoethyl-γ-aminopropyl trimethoxysilane, βaminoethyl-γ-aminopropyl triethoxysilane, γ-aminopropyl -γ-aminopropyl trimethoxysilane, γ-aminopropyl trimethoxysilane and γ-aminopropyl triethoxysilane.

3. A method for preparing asphalt having a high adhesion strength, which comprise incorporating in road-paving asphalt from 0.3 to 2 percent by weight, based on the amount of asphalt, of an aminoalkyl polyakoxsilane having the formula:

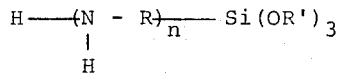

wherein R is alkylene having two or three carbon atoms, R' is alkyl having one or two carbon atoms and n is an integer of 1 to 2.

* * * * *

Disclaimer 3,861,933.—*Tadashi Doi*, Osaka, Japan. ASPHALT HAVING HIGH ADHESION STRENGTH AND ITS PREPARATION. Patent dated Jan. 21, 1975. Disclaimer filed Sept. 21, 1976, by the assignee, *Kao Soap Co., Ltd.*

Hereby enters this disclaimer to claims 1, 2 and 3 of said patent.

[*Official Gazette November 23, 1976.*]